(12) United States Patent
Kuchibhotla et al.

(10) Patent No.: US 8,018,895 B2
(45) Date of Patent: Sep. 13, 2011

(54) APPARATUS AND METHOD FOR TRANSMITTING UPLINK CONTROL INFORMATION ON SHARED CHANNELS

(75) Inventors: Ravi Kuchibhotla, Gurnee, IL (US); Padmaja Putcha, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 747 days.

(21) Appl. No.: 11/565,537

(22) Filed: Nov. 30, 2006

(65) Prior Publication Data
US 2008/0130557 A1 Jun. 5, 2008

(51) Int. Cl.
*H04W 4/00* (2009.01)
(52) U.S. Cl. ........ 370/329; 370/310; 370/508; 370/241; 370/335
(58) Field of Classification Search .................. 370/329, 370/310, 508, 241, 335; 455/450
See application file for complete search history.

(56) References Cited

U.S. PATENT DOCUMENTS

| | | |
|---|---|---|
| 2004/0058687 A1 | 3/2004 | Kim et al. |
| 2005/0063330 A1 | 3/2005 | Lee et al. |
| 2005/0174982 A1 | 8/2005 | Uehara et al. |
| 2005/0176430 A1 | 8/2005 | Lee et al. |
| 2005/0220049 A1 | 10/2005 | Zhang et al. |
| 2005/0243761 A1 | 11/2005 | Terry et al. |
| 2005/0249148 A1 | 11/2005 | Nakamata et al. |
| 2005/0259662 A1 | 11/2005 | Kim et al. |
| 2005/0265301 A1 | 12/2005 | Heo et al. |
| 2006/0079257 A1 | 4/2006 | Iochi et al. |
| 2006/0104240 A1 | 5/2006 | Sebire et al. |
| 2007/0070926 A1 * | 3/2007 | Bachl et al. ............. 370/310 |
| 2007/0275728 A1 * | 11/2007 | Lohr et al. .............. 455/450 |

OTHER PUBLICATIONS

Motorola, "Out of Order Scheduling Information", 3GPP TSG-RAN-WG2 Meeting #54, vol. R2-062249, Aug. 28, 2006.
Huawei, "Scheduling Information Re-Transmission and Re-Triggering", 3GPP TSG-RAN-WG2 Meeting #54, vol. R2-062148, Aug. 28, 2006.

* cited by examiner

*Primary Examiner* — David Q Nguyen
(74) *Attorney, Agent, or Firm* — Hisashi D. Watanabe; Vedder Price P.C.; Joseph T. Cygan

(57) ABSTRACT

Mobile station applications (419) may include an SI unit (409) for piggy backing SI onto data stored in data buffer (421) and also for adding an indicator to the SI information. The scheduling information and/or incremental control information (501) is piggy backed onto a data PDU and also has a sequence number (503) and an indicator field (505) which is added by the SI unit, such as SI unit (409), in accordance with the embodiments. The indicator may be a bit map having four bit positions. A bit position having a binary "1" value may be utilized to indicate that a previous SN of SI information remains valid. For example, "0100" of the bit map sequence may indicate that SN #3 is still valid. The base station or controller may then determine whether to implement or discard an SI information having the indicated SN.

10 Claims, 5 Drawing Sheets

APPARATUS AND METHOD FOR TRANSMITTING UPLINK CONTROL INFORMATION ON SHARED CHANNELS

FIELD OF THE DISCLOSURE

The present disclosure relates generally to scheduling data transmission on a communications channel and more particularly to methods and apparatuses for providing segmented scheduling and/or control information in a correct sequence for uplink data transmissions using a data transmission resource.

BACKGROUND

Wireless communications systems, for example packet data communications systems, may utilize shared channels wherein the network allocates resources to a mobile station for uplink transmissions based on the number of mobiles requesting resources, the channel conditions of the mobile station, and the services for which the mobile station is requesting resources.

The mobile station will transmit information to the network regarding a buffer status of each radio bearer or for a group of radio bearers. Typically each service utilized by the mobile station is mapped to one radio bearer. Each service and thus, each radio bearer, is associated with a priority. In order to minimize the amount of signaling overhead, it is preferred to have a mobile station indicate the amount of data in its buffer across all radio bearers and indicate for example, the highest priority radio bearer that has data waiting to be sent. This allows the network to assign resources with some degree of fairness.

The buffer status information, which may be referred to as scheduling information (SI), may be transmitted by the mobile over an uplink control channel that terminates effectively in layer 1 or Medium Access Control (MAC) layer, or as piggy back information to the network over a shared data channel. So-called piggy back information is scheduling and/or control information, which may be segmented, and added to data packets being transmitted on a data channel.

The data transmitted over the shared data channel is transmitted using parallel Hybrid Automatic Repeat Request (HARQ) channels or processes. However, the HARQ mechanism implies that data packets, which may have piggy backed scheduling and/or control information, may be received by the network out-of-sequence. This is particularly true in the case where the control information, which is common across all IP flows, is appended to data packets associated with one of the IP flows. In this case, the sequence number associated with the data packets cannot be used to sequence the control information. Thus, for example, scheduling information may not be received at the relevant time, or if segmented, may be received, and possibly applied, in an incorrect order.

Therefore, although the network has a mechanism for determining the correct order of segmented data received in out-of-order packets, the scheduler at the network cannot discern the order of piggy backed information and may then schedule the mobile on the basis of incorrect information.

Further, various rules may be applied to allow the mobile to send SI on a periodic basis or on an event triggered basis, which may result in quite rapid sequential SI transmissions.

Thus, there is a need for apparatuses and methods for indicating a sequence order of scheduling and/or control information where the scheduling and/or control information is included in packets having sequence numbers that are not necessarily related to the sequence of included scheduling and/or control information.

DETAILED DESCRIPTION

In the various embodiments, an indicator implemented via a 2-bit/3-bit sequence number is added to SI being piggy backed on a data packet, to assist a network scheduler to identify out-of-sequence delivery and thereby avoiding problems that would result due to ARQ/HARQ for the data packet portions.

The scheduler of the various embodiments may apply or simply discard any out-of-sequence reception of SI as determined by the indicator. Further, operation may be simplified by applying a window of size one to the scheduler in some embodiments, thereby ensuring the identification of old SI. Further in some embodiments, limiting the number of SI transmission triggers assists in preventing application of expired SI.

Figure 1:
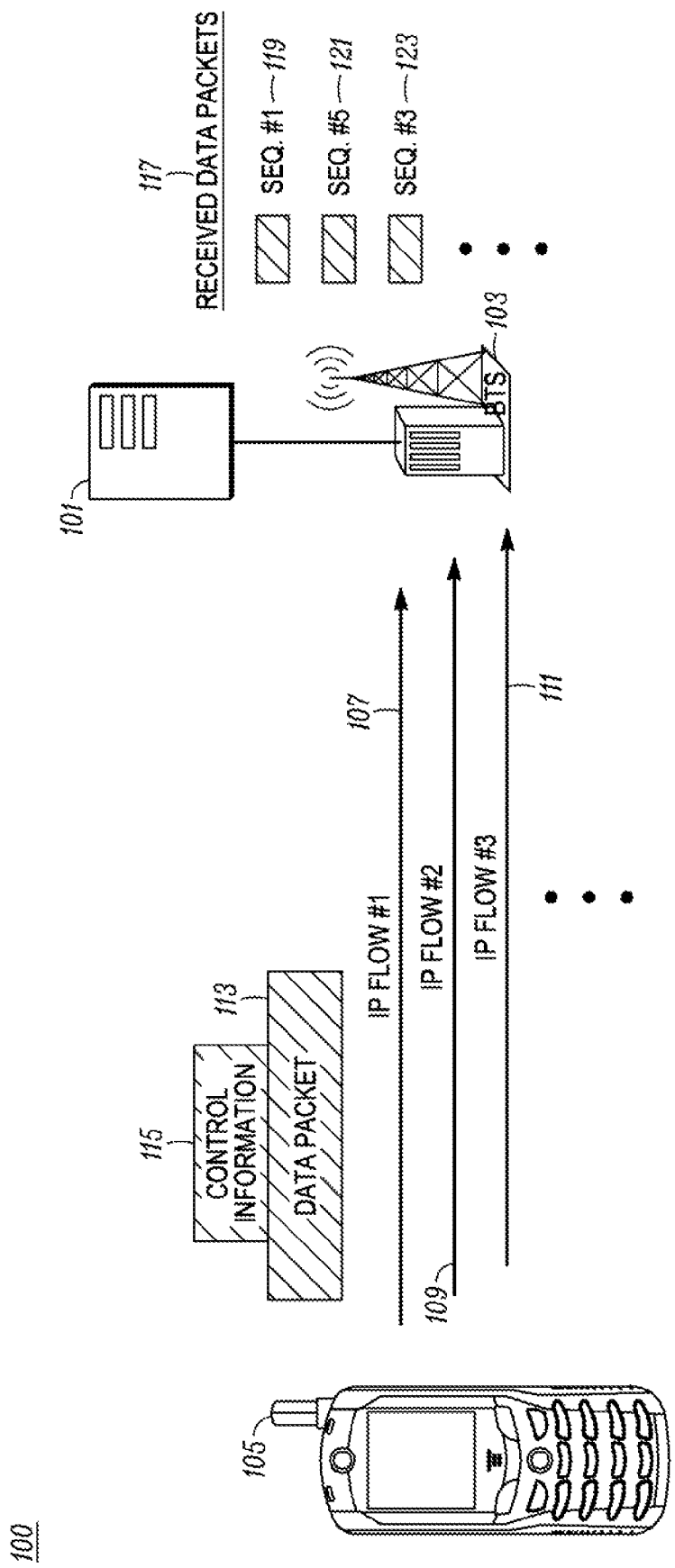
FIG. 1 is a block diagram of a wireless packet communication network wherein mobile stations may transmit scheduling and/or control information piggy packed on packet data transmitted over various Radio Bearers or IP flows.

Turning now to the drawings wherein like numerals represent like components, FIG. 1 illustrates a communications network 100, having various base stations such as base station 103, and wherein each base station has a corresponding coverage area. In general, base station coverage areas may overlap and, in general, form an overall network coverage area. The base stations may be referred to by other names such as base transceiver station (BTS), "Node B", and access node (AN), depending on the technology. A network coverage area may comprise a number of base station coverage areas, which may form a contiguous radio coverage area. However, it is not required to have contiguous radio coverage and therefore a network coverage area may alternatively be distributed.

Furthermore, each coverage area may serve a number of mobile stations. Mobile stations may also be referred to as access terminals (ATs), user equipment (UEs), or other terminology depending on the technology. A number of bases stations 103 will be connected to a base station controller 101 via backhaul connections. The base station controller 101 and base stations form a Radio Access Network (RAN). The overall network may comprise any number of base station controllers, each controlling a number of base stations. Note that the base station controller 101 may alternatively be implemented as a distributed function among the base stations 103. Regardless of specific implementations, the base station controller 101 comprises various modules for packetized communications such as a packet scheduler, packet segmentation and reassembly, etc., and modules for assigning appropriate radio resources to the various mobile stations.

The base stations 103 may communicate with the mobile stations via any number of standard air interfaces and using any number of modulation and coding schemes. For example, Universal Mobile Telecommunications System (UMTS), Evolved UMTS (E-UMTS) Terrestrial Radio Access (E-UTRA) or CDMA2000 may be employed. Further, E-UMTS may employ Orthogonal Frequency Division Multiplexing (OFDM) and CDMA2000 may employ orthogonal spreading codes such as the Walsh codes. Semi-orthogonal spreading codes may also be utilized to achieve additional channelization over the air interface. Further the network may be an Evolved High Rate Packet Data (E-HRPD) network. Any appropriate radio interface may be employed by the various embodiments.

In some embodiments, mobile stations may be grouped and for each mobile station group, a scheduling function of the base station controller 101, or base station 103, may assign a set of time-frequency resources to be shared by the mobile stations in the group. An indication of the set of shared resources and an ordering pattern may be signaled from the base station 103 to the mobile stations using a control channel. Further, the control channel may be transmitted in any frame with a pre-defined relationship with the beginning frame of the set of shared resources. The set of shared resources may begin in the same frame the control channel is transmitted, may have a fixed starting point relative to the frame that the control channel is transmitted, or may be explicitly signaled in the control channel. In any case, the various embodiments will employ a grant message for allocating resources to a mobile station and a scheduling message indicating a minimum data priority.

In the various embodiments, mobile stations will utilize radio bearers to transmit protocol data units (PDUs) wherein the radio bearers may be mapped to a set of predetermined services of Internet Protocol (IP) flows. Mobile stations may thus be utilizing multiple services simultaneously and may therefore buffer data for transmission wherein the data has various priorities. Thus some mobile stations 105 may have only high priority data buffered and waiting to be transmitted, whereas other mobile stations may only have low priority data waiting for transmission. Additionally, some mobile stations may have a mix of high a low priority data. Thus, in some embodiments radio bearers/IP flows may be transmitted by the mobile station 105 according to a prioritization scheme.

Mobile station 105 may, in addition to PDUs transmitted using the various radio bearers or IP flows 107, 109 and 111, append or "piggy back" scheduling information (SI) and/or control information 115 onto a data packet or PDU 113.

The PDUs will, in general, be transmitted using an ARQ or HARQ scheme wherein the PDU will have an associated sequence number (SN) such that the data may be reassembled on the receiving end, which in this case is base station 103 or controller 101.

Thus, as shown by received data packets 117, PDUs may be received out of sequence order, thus PDU SN #1 119 was received first, whereas PDU SN#5 was received next and PDU SN#3 was received last, etc.

Figure 2:
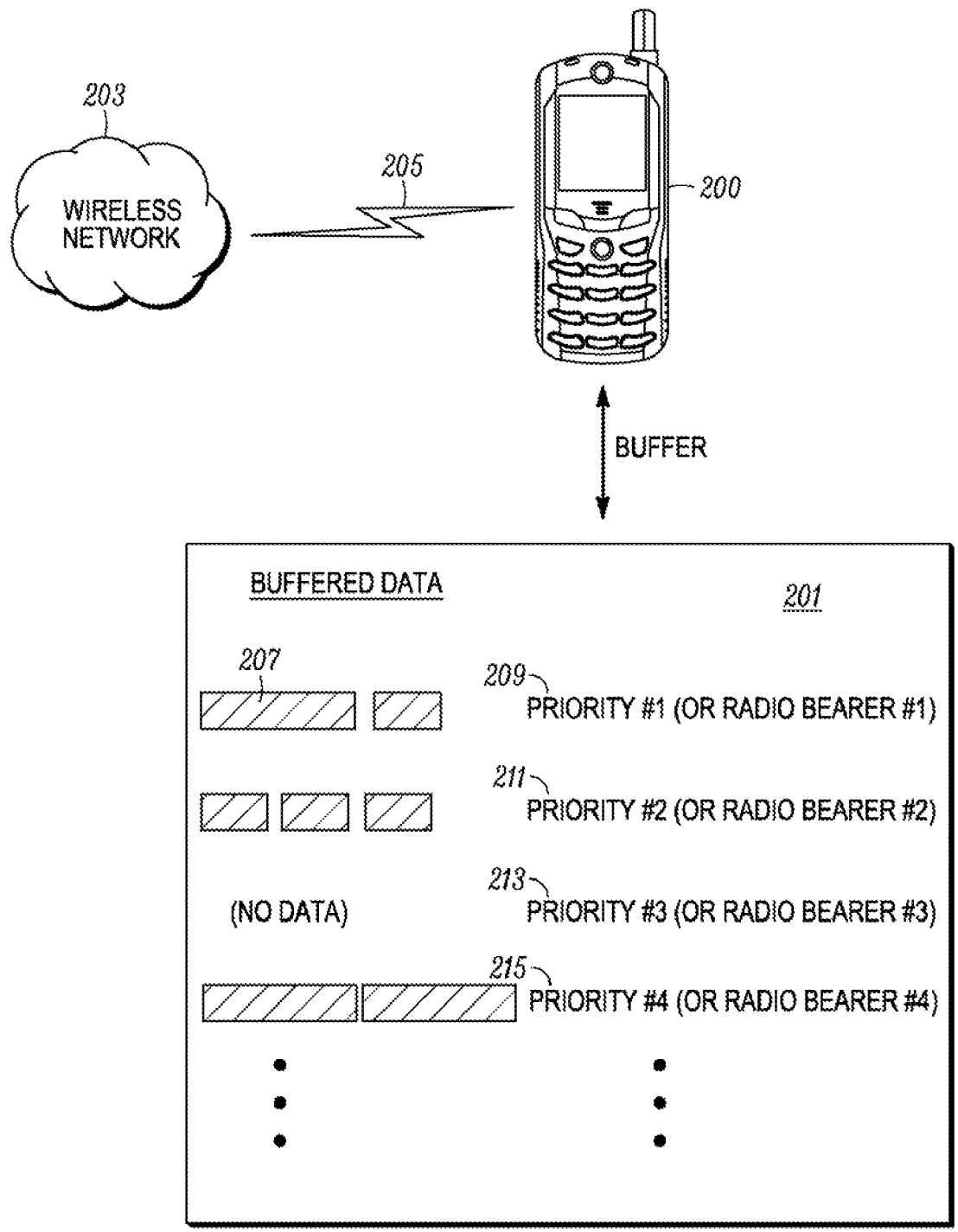
FIG. 2 is block diagram of a mobile station transmission buffer wherein data of various priorities is buffered and/or queued.

FIG. 2 illustrates a mobile station 200, which communicates with a wireless network 203 via a wireless interface 205 which may include a dedicated channel or enhanced dedicated channel in some embodiments. The mobile station 200 has a memory comprising buffered data 201, which further comprises sets of PDUs 207 associated with various services and/or radio bearers. As discussed above, specific services may be mapped to specific radio bearers in the various embodiments.

In the example of FIG. 2, a mobile station having a mix of high and low priority data, such as mobile stations 109 in FIG. 1 is illustrated. In FIG. 2, a first set of PDUs is shown buffered having a first or high priority and corresponding to a first radio bearer, that is, priority #1 data mapped to radio bearer #1 209. Similarly, a second set of PDUs is shown buffered having a second level priority and corresponding to a second radio bearer, that is, priority #2 data mapped to radio bearer #2 211.

In the FIG. 2 example, no level 3 data is buffered and thus no priority #3 data, which is mapped to radio bearer #3 213, is stored. Also in FIG. 2, data is buffered for priority #4 mapped to radio bearer #4 215. It is thus to be understood that data may be stored having any mix of priorities wherein any specific priority may be mapped to a specific radio bearer as exemplified by FIG. 2. Given a granted set of resources, the mobile station 200 would proceed to transmit its highest priority data 209, proceed to its lower priority data 211, and finally transmit its lowest priority data 215.

Returning briefly to FIG. 1, if the mobile station 105 piggy backs SI or control information to PDUs according to SNs the SI or control information may be out-of-order either due to out-of-order PDUs, prioritized PDUs, or due to the lack of specific data timing over the IP flows 107, 109, 111, etc. A particular problem occurs when the SI or control information is common across all IP flows 107, 109, 111, etc., but is appended to data packets associated with one of the IP flows, for example IP Flow #1 107. The sequence number associated with data packet 113 cannot be used to sequence the control information 115.

Figure 3:
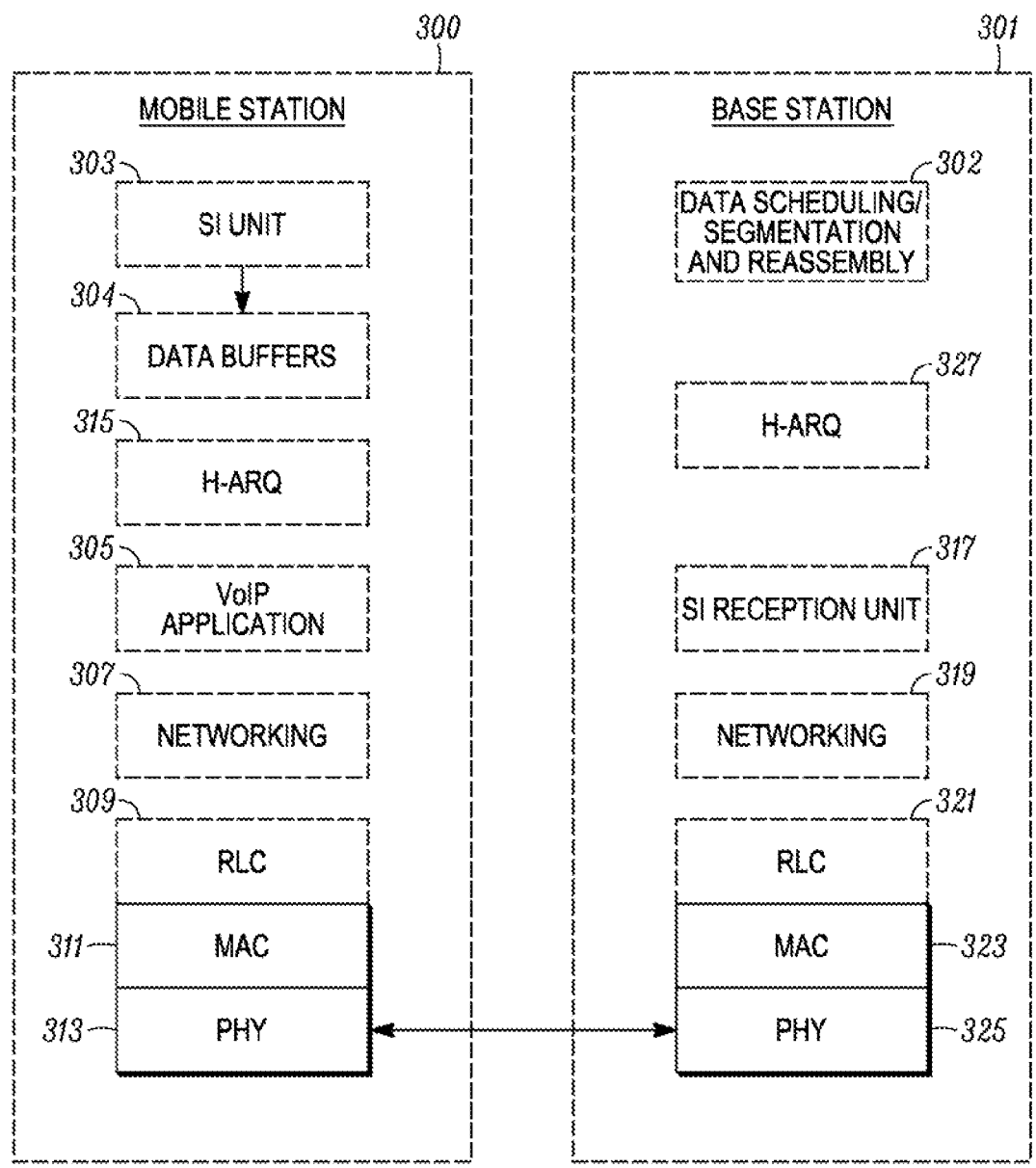
FIG. 3 is diagram showing a mobile station and base station architecture in accordance with various embodiments.

Turning now to FIG. 3, a mobile station 300 and base station 301 architectures in accordance with the various embodiments are illustrated. Mobile station 300 comprises a stack having a VoIP application 305, a networking layer 307, a Radio Link Controller (RLC) 309, a Medium Access Controller (MAC) 311, and a Physical Layer (PHY) 313. In addition, mobile station 300 has HARQ component 315, which may be separate or may be integrated into any of the other components/layers. The mobile station 301 HARQ component 315 may receive messages for determining resource allocations for transmitting or receiving data. The mobile station may transmit and receive various messages to and from the base station on the physical layer 313.

In accordance with the embodiments, mobile station 300 has a data buffer or data buffers 304 for storing data associated with a service, radio bearer and/or priority. Further, mobile station 300 has an SI unit 303, for piggy backing SI and/or control information to PDUs over various radio bearers, and for including an indicator with the SI. The SI and/or control information may be incremental control information such as, but not limited to, Channel Quality Indicator (CQI), buffer status, etc.

The base station 301, similar to mobile station 300, has a networking layer 319, a RLC 321, MAC 323 and PHY 325. However, base station 301 additionally may have in some embodiments a HARQ scheduling component 327. The base station 301 HARQ scheduling component 327 may send various messages to mobile stations for indicating their resource allocations for transmitting or receiving data. Further, the HARQ scheduling component 327 may define HARQ subgroups in some embodiments.

The base station of the embodiments also comprises data scheduling/segmentation and reassembly module 302. The module 302 may be a separate module as shown, or may be integrated into various other modules such as HARQ scheduling component 327. Further, the modules shown in FIG. 3 may be distributed between a base station and network controller, such as the network controller 101 and base station 103 illustrated in FIG. 1.

Returning to FIG. 3, module 302 determines the mobile station data transmission schedule and may also determine various data priority levels for which mobile stations may transmit data over granted resources, in some embodiments.

The module 302, in accordance with the embodiments, may receive SI, such as, but not limited to, mobile station buffer status, from the SI reception unit 317. The SI reception unit 317 receives the SI from the mobile station 300 and determines the order of received SI that was piggy backed to PDUs, and also determines when and whether any such information is obsolete and should be discarded.

Figure 4:
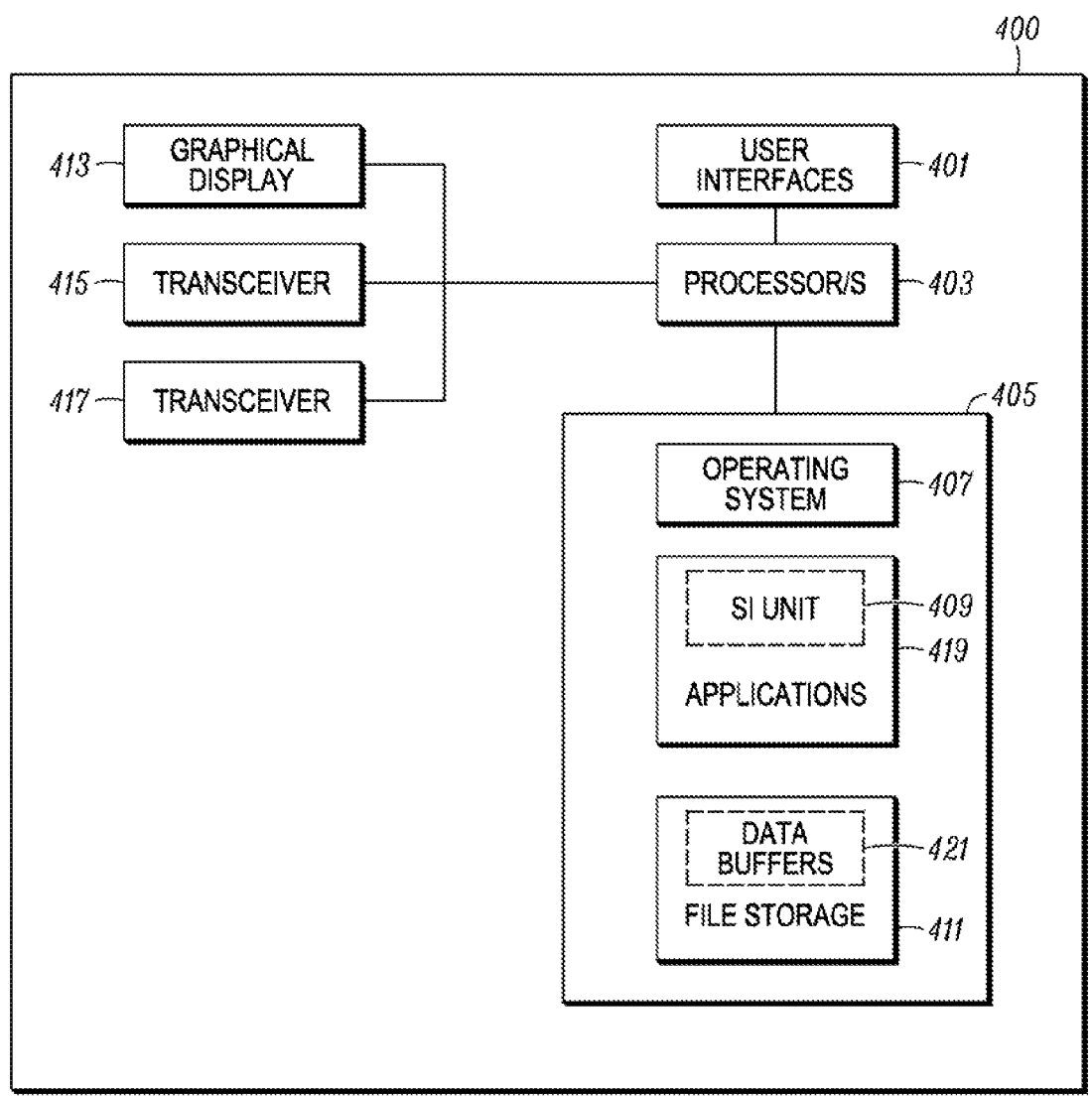
FIG. 4 is block diagram of a mobile station in accordance with various embodiments.

FIG. 4 is a block diagram illustrating the primary components of a mobile station in accordance with some embodiments. Mobile station 400 comprises user interfaces 401, at least one processor 403, and at least one memory 405. Memory 405 has storage sufficient for the mobile station operating system 407, applications 419 and general file storage 411. Mobile station 400 user interfaces 401, may be a combination of user interfaces including but not limited to a keypad, touch screen, voice activated command input, and gyroscopic cursor controls. Mobile station 400 has a graphical display 413, which may also have a dedicated processor and/or memory, drivers etc. which are not shown in FIG. 4.

It is to be understood that FIG. 4 is for illustrative purposes only and is for illustrating the main components of a mobile station in accordance with the present disclosure, and is not intended to be a complete schematic diagram of the various components and connections therebetween required for a mobile station. Therefore, a mobile station may comprise various other components not shown in FIG. 4 and still be within the scope of the present disclosure.

Returning to FIG. 4, the mobile station 400 may also comprise a number of transceivers such as transceivers 415 and 417. Transceivers 415 and 417 may be for communicating with various wireless networks using various standards such as, but not limited to, UMTS, E-UMTS, E-HRPD, CDMA2000, 802.11, 802.16, etc.

Memory 405 is for illustrative purposes only and may be configured in a variety of ways and still remain within the scope of the present disclosure. For example, memory 405 may be comprised of several elements each coupled to the processor 403. Further, separate processors and memory elements may be dedicated to specific tasks such as rendering graphical images upon a graphical display. In any case, the memory 405 will have at least the functions of providing storage for an operating system 407, applications 419 and general file storage 411 for mobile station 400. In some embodiments, and as shown in FIG. 3, applications 419 may comprise a software stack that communicates with a stack in the base station. In the various embodiments, file storage 411 may comprise the data buffers 421 for storing data of various priority levels prior to transmission.

Also in the various embodiments, applications 419 may include an SI unit 409 for piggy backing SI onto data stored in data buffer 421 and also for adding an indicator to the SI information.

Figure 5A:
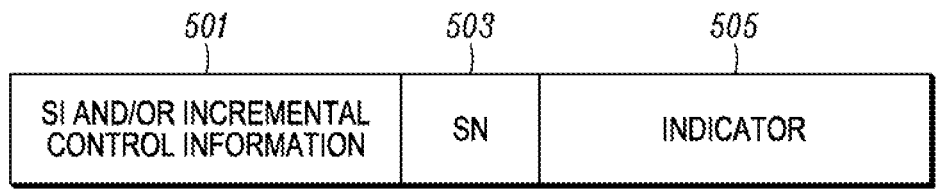
FIG. 5a and FIG. 5b are bit map diagrams illustrating the structure of SI and/or incremental control information and an indicator transmitted by a mobile station by piggy backing the SI etc. on a PDU, in accordance with the various embodiments.
Figure 5B:
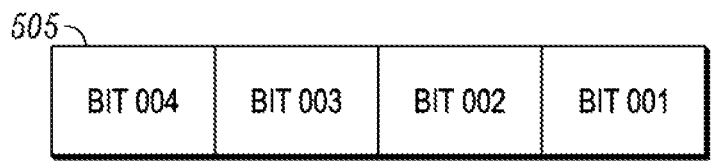

FIG. 5a and FIG. 5b are bit may diagrams illustrating the SI and/or incremental control information 501 that is piggy backed onto a data PDU and also having an SN 503 and an indicator field 505 which is added by the SI unit, such as SI unit 409, in accordance with the embodiments. FIG. 5b shows further details of the indicator which may be a bit map having four bit positions. A bit position having a binary "1" value may be utilized to indicate that a previous SN of SI information remains valid. For example, "0100" of the bit map sequence may indicate that SN #3 is still valid. The base station or controller may then determine whether to implement or discard an SI information having the indicated SN.

Thus the amount of SI transmitted by the mobile station may be limited by the indicator of some embodiments, as the indicator assists the base station or controller scheduler to identify any previous SI that may be stored. For example, some SI which provided information on a different radio bearer or radio bearers of a different priority may still be valid. A new SI transmission may have been prompted by arrival of data in the highest priority data radio bearer, while the previous SI which was sent providing information of lower priority data radio bearers may still be valid, although no ACK may have been received by the mobile station indicating that the network successfully received the SI. Thus the indicator provides sequence numbers of previous SI that is still valid, which thereby limits the information transmitted to that triggering the current SI transmission.

The SN field 503 may be 2 or 3 bits in length and indicates an SN pertaining to the SI and/or incremental control information, but that is not related the SN of the piggy back host PDU.

In some embodiments wherein radio bearer groups are defined an SN per group, the network may configure transmission of scheduling information for each group separately either on a periodic basis or on an event triggered basis. The mobile may append the common control information to a data payload associated with any radio bearer group, thereby potentially resulting in out-of-order reception at the network. Therefore in a related embodiment, a control information sequence number is used wherein the sequence number is common across all data packets associated with a particular radio bearer group.

Figure 6:
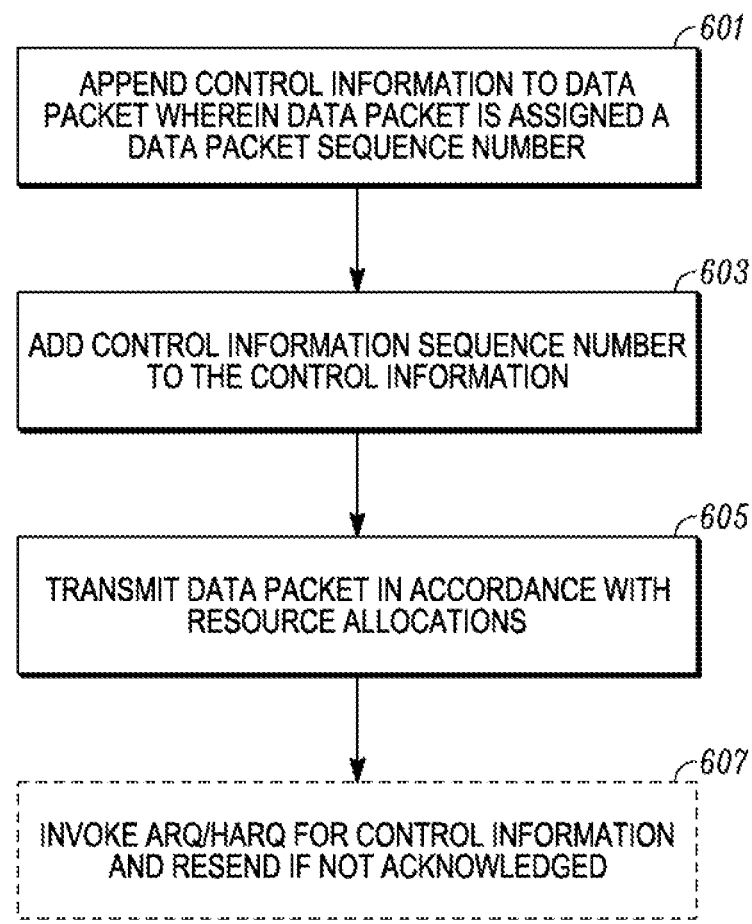
FIG. 6 is a flow chart illustrating a method in accordance with the embodiments.

FIG. 6 illustrates high level operation of the embodiments. In 601, control information which may include scheduling information is appended, or "piggy backed" onto a data packet where the data packet is assigned a sequence number. In 603, a control information sequence number, which is different from the data packet sequence number, is added to the control information. In 605 the data packet is transmitted in accordance with the relevant resource allocations. In 607, in some embodiments, an ARQ/HARQ mechanism may be employed for the control information such that the control information may be acknowledged. If the control information is explicitly not acknowledged by a "not acknowledge" message, the control information may be resent, by again piggy backing it onto a data packet. The control information may also be subject to a timer such that if no "acknowledge" or "not acknowledge" is received before the timer times out, the control information may be resent.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of operating a mobile station, the method comprising:
    appending, by the mobile station, control information to a data packet wherein said data packet has a data packet sequence number;
    adding, by the mobile station, a control information sequence number to said control information, said control information sequence number different from said data packet sequence number; and transmitting, by the mobile station, said data packet in accordance with a resource allocation for said data packet.

2. The method of claim 1, further comprising:

resending, by the mobile station, said control information a second time if a not acknowledge message is received for said data packet.

3. The method of claim 1, further comprising:

adding, by the mobile station, a bit map to said control information, said bit map indicating a control information sequence number of a previously transmitted control information wherein said previously transmitted control information is still valid.

4. The method of claim 1, further comprising:

adding, by the mobile station, a bit map to said control information, said bit map indicating a control information sequence number of a previously transmitted control information wherein said previously transmitted control information is no longer valid and may be discarded.

5. The method of claim 1, wherein said control information is scheduling information.

6. The method of claim 1, wherein said control information includes channel quality information.

7. A mobile station comprising:

at least one transceiver;

at least one processor coupled to said transceiver; said transceiver and said processor configured to:

append a control information to a data packet wherein said data packet has a data packet sequence number;

add a control information sequence number to said control information, said control information sequence number different from said data packet sequence number; and transmit said data packet in accordance with a resource allocation for said data packet.

8. The mobile station of claim 7, wherein said transceiver and said processor are further configured to:

resend said control information a second time if a not acknowledge message is received for said data packet.

9. The mobile station of claim 7, wherein said transceiver and said processor are further configured to:

add a bit map to said control information, said bit map indicating a control information sequence number of a previously transmitted control information wherein said previously transmitted control information is still valid.

10. The mobile station of claim 7, wherein said transceiver and said processor are further configured to:

add a bit map to said control information, said bit map indicating a control information sequence number of a previously transmitted control information wherein said previously transmitted control information is no longer valid and may be discarded.

* * * * *